United States Patent
Finney et al.

(10) Patent No.: US 12,439,145 B1
(45) Date of Patent: Oct. 7, 2025

(54) DETERMINING AN INTENDED GESTURE WHEN HANDS ARE OCCUPIED

(71) Applicants: Nathaniel R. Finney, San Francisco, CA (US); Jean-Charles Bernard Marcel Bazin, Sunnyvale, CA (US); Srimanth Gunturi, Cupertino, CA (US)

(72) Inventors: Nathaniel R. Finney, San Francisco, CA (US); Jean-Charles Bernard Marcel Bazin, Sunnyvale, CA (US); Srimanth Gunturi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 460 days.

(21) Appl. No.: 17/448,638

(22) Filed: Sep. 23, 2021

Related U.S. Application Data

(60) Provisional application No. 63/083,341, filed on Sep. 25, 2020.

(51) Int. Cl.
| | |
|---|---|
| G06K 9/00 | (2022.01) |
| G06F 3/01 | (2006.01) |
| G06V 40/20 | (2022.01) |
| H04N 23/611 | (2023.01) |
| H04N 23/65 | (2023.01) |
| H04N 23/695 | (2023.01) |

(52) U.S. Cl.
CPC .......... *H04N 23/611* (2023.01); *G06F 3/017* (2013.01); *G06V 40/28* (2022.01); *H04N 23/651* (2023.01); *H04N 23/695* (2023.01)

(58) Field of Classification Search
CPC .. H04N 23/611; H04N 23/695; H04N 23/651; G06V 40/28; G06F 3/017
See application file for complete search history.

(56) References Cited

U.S. PATENT DOCUMENTS

| | | | |
|---|---|---|---|
| 8,760,398 | B2 | 6/2014 | Pryor |
| 9,727,145 | B2 | 8/2017 | Murase |
| 9,766,709 | B2 | 9/2017 | Holz |
| 10,127,886 | B2 | 11/2018 | Schwarz |
| 10,311,638 | B2 * | 6/2019 | Da Veiga ............... G06F 3/013 |
| 10,360,734 | B2 | 7/2019 | Drouin |
| 10,416,834 | B1 | 9/2019 | Holz |

(Continued)

OTHER PUBLICATIONS

Angelini, Leonardo, et al. "Move, hold and touch: a framework for tangible gesture interactive systems." Machines 3.3 (2015): 173-207. (Year: 2015).*

(Continued)

*Primary Examiner* — Avinash Yentrapati
(74) *Attorney, Agent, or Firm* — Blank Rome LLP

(57) ABSTRACT

Hand tracking techniques are used to initiate actions at a computer even if a hand is occupied. Image data is received of a scene that includes a hand. A determination is mate whether the hand is occupied by a physical object. If the hand is occupied by a physical object, then the hand is monitored for a modified gesture based on the physical object. Some objects may be pre-registered and associated with object-specific actions for various gestures. When a user is within a predetermined distance of a registered object, a system monitors a user's hands for a gesture, and then triggers an action based on the gesture and the object.

20 Claims, 6 Drawing Sheets

(56) References Cited

U.S. PATENT DOCUMENTS

| | | |
|---|---|---|
| 10,712,837 B1 | 7/2020 | Douglas |
| 10,809,808 B2 | 10/2020 | Goel |
| 10,845,885 B2 | 11/2020 | Bostick |
| 10,937,240 B2 | 3/2021 | Anderson |
| 11,023,036 B1 | 6/2021 | Atlas |
| 11,106,327 B2 | 8/2021 | Mani |
| 2008/0170776 A1 | 7/2008 | Albertson |
| 2015/0140535 A1 | 5/2015 | Geri |
| 2015/0331576 A1 | 11/2015 | Piya |
| 2015/0346829 A1 | 12/2015 | Chang |
| 2016/0027188 A1 | 1/2016 | Marks |
| 2016/0071319 A1 | 3/2016 | Fallon |
| 2016/0100051 A1* | 4/2016 | Yliaho .................... H04M 1/57 455/415 |
| 2017/0097687 A1 | 4/2017 | Pinault |
| 2017/0161957 A1 | 6/2017 | Yajima |
| 2018/0004780 A1 | 1/2018 | Walker |
| 2018/0095542 A1 | 4/2018 | Mallinson |
| 2018/0189974 A1 | 7/2018 | Clark |
| 2018/0325601 A1 | 11/2018 | Mak |
| 2019/0034076 A1 | 1/2019 | Fnu |
| 2019/0043260 A1 | 2/2019 | Anderson |
| 2019/0324549 A1 | 10/2019 | Araki |
| 2019/0346967 A1 | 11/2019 | Ikeda |
| 2019/0370984 A1 | 12/2019 | Tsai et al. |
| 2020/0110928 A1* | 4/2020 | Al Jazaery ........... G05B 19/042 |
| 2020/0142495 A1 | 5/2020 | Steinberg |
| 2020/0341538 A1 | 10/2020 | Zhu |
| 2021/0034870 A1 | 2/2021 | Ha |
| 2021/0287330 A1 | 9/2021 | Nagano |
| 2022/0215677 A1 | 7/2022 | Kaji |

OTHER PUBLICATIONS

Kim, Jungsoo, et al. "The gesture watch: A wireless contact-free gesture based wrist interface." 2007 11th IEEE International Symposium on Wearable Computers. IEEE, 2007. (Year: 2007).*

"Using Kinect to draw 3D AutoCAD polylines," Through the Interface(https://www.keanw.com/), Apr. 21, 2011.

Cheng, et al., "iCON: Utilizing Everyday Objects as Additional, Auxiliary and Instant Tabletop Controllers," Proceedings of the 2010 SIGCHI Conference on Human Factors in Computing Systems, Apr. 2010.

Choi, et al., "CLAW: A Multifunctional Handheld Haptic Controller for Grasping, Touching, and Triggering in Virtual Reality," Proceedings of the 2018 CHI Conference on Human Factors in Computing Systems, Apr. 2018.

Matt, "Draw in 3d with the Kinect," Kinect Hacks, Feb. 22, 2011.

Sharma, et al., "Grasping Microgestures: Eliciting Single-hand Microgestures for Handheld Objects," Proceedings of the 2019 CHI Conference on Human Factors in Computing Systems, May 2019.

Zhou, et al., "Gripmarks: Using Hand Grips to Transform In-Hand Objects into Mixed Reality Input," CHI 2020 Paper, Apr. 2020.

Wolf, Katrin, et al. "A taxonomy of microinteractions: Defining microgestures based on ergonomic and scenario-Dependent requirements."Human-ComputerInteration—INTERACT 2011:13th IFIP TC 13 International Conference, Portugal, Sep. 5-9, 2011,Proceedings, Part I 13. Springer Berlin Heidelberg, 2011 (Year: 2011).

* cited by examiner

DETERMINING AN INTENDED GESTURE WHEN HANDS ARE OCCUPIED

BACKGROUND

Today's electronic devices provide users with many ways to interact with the world around them. For example, users may interact with electronic devices using virtual or physical keyboards, mice, trackballs, joysticks, touch screens, and the like. One way that users often interact with digital information on their device is through a touch screen interface. Touch screen interfaces allow a user to interact with a display surface using a finger, stylus, or other object. A touch sensor recognizes the area touched and provides a response to a user.

With the rise of extended reality technology, users often provide input by additional means by providing gestures which can be interpreted as user input. As an example, a swipe on a general surface may be detected and identified as user input. However, a user may try to use gestures as input when a user's hands are occupied, such as when a user is holding keys or a coffee mug. As such, an improved technique is needed to recognize gesture input when a user's hands are occupied.

DETAILED DESCRIPTION

Figure 1A:
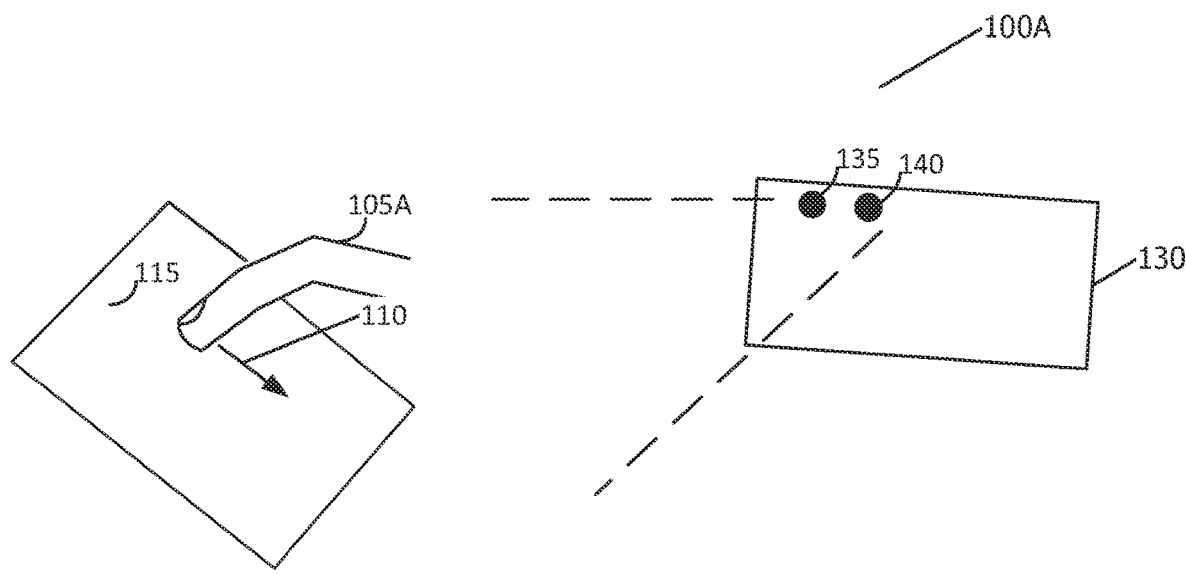
FIGS. 1A and 1B show diagrams of system setups for utilizing gesture input with occupied hands, according to some embodiments.

This disclosure relates generally to user input techniques. More particularly, but not by way of limitation, this disclosure relates to techniques and systems for automatically determining whether to track hand gestures based on an occupied mode or an un-occupied mode and performing vision-based input based on a selected mode.

This disclosure pertains to systems, methods, and computer readable media to utilize gesture input when a user's hand is occupied. Vision-based hand tracking may be utilized to determine whether a user's hand is occupied. If the user's hand is occupied, the vision-based tracking system monitors the hand for modified gestures. For example, a user' hand may be gripping a real-world object, such as keys or a coffee mug. Techniques described herein determine characteristics of the object occupying the hand, and then monitor for modified gestures based on the characteristics of the physical object. For example, an object may be detected in the user's hand. In some embodiments, the object may be classified to determine an object type, an object geometry, or the like. Hand pose estimation may be utilized to determine a gesture or movement of the hand in relation to the geometry of the object. A modified gesture may be detected based on the hand pose and the object characteristics. The modified gesture may be used to determine an action to be triggered. As such, an unmodified gesture may trigger a same action as a modified gesture depending on the geometry of the object occupying the hand when the modified gesture is performed.

Techniques described herein also describe systems, methods, and computer readable media to initiate hand tracking based on a determination that a user is within a threshold distance of a registered physical object. For example, one or more physical items may be registered with particular actions, such that when a user interacts with the registered object in a particular matter, a predetermined action may be initiated. For example, localization of a client device may be used to determine whether a user is within the predetermined distance of a registered object. In response to the user being within the threshold distance, a camera stream, sensor stream, or other tracking components may be initiated. The user's hands may be monitored for a predetermined gesture. The gesture may be an object-specific gesture, such as a gesture pre-registered with the registered object. Further, the gesture may be associated with an object-specific action as part of the object registration. In response to recognizing a particular gesture, the system may perform the registered action or otherwise cause the action to be initiated.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or a camera system capable of sensing the depth of the captured scene.

Figure 1B:
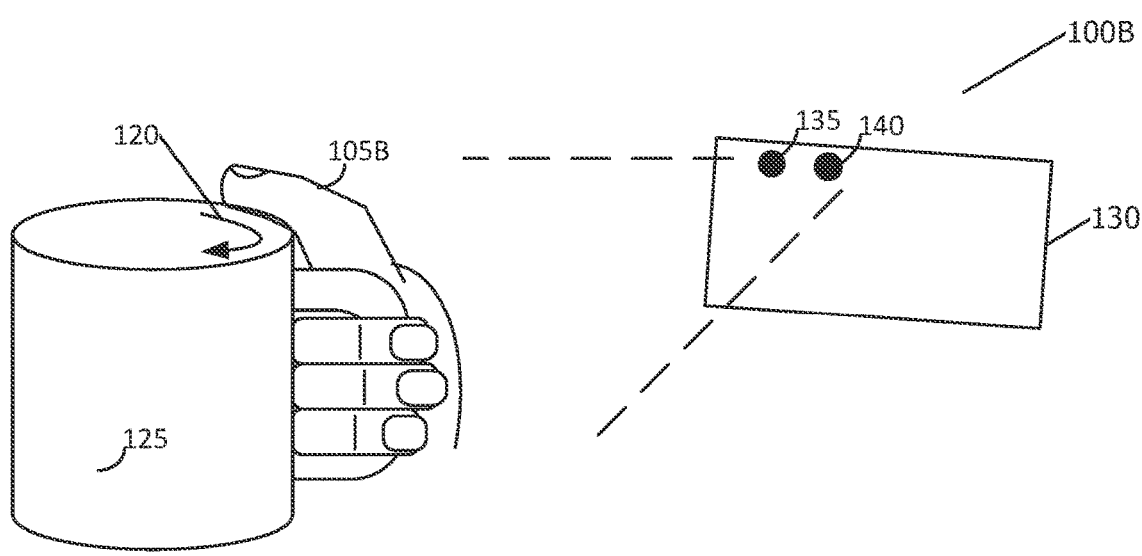

FIGS. 1A-1B show example system setups for performing the techniques described herein. For purposes of explanation, the various components and processes are explained in relation to particular components. However, it should be understood that the various processes and components may be performed or substituted for other processes or components as described herein. It should be understood that the system setups are depicted primarily as an example to aid in the understanding of the techniques described herein.

FIG. 1A depicts a system setup 100A for performing an action associated with an intended gesture when a hand is unoccupied. The system set up 100A includes electronic device 130, which includes one or more cameras 135 and/or one or more depth sensors or additional sensors 140. The various sensors may collect data from a scene that includes a user's hand or portion of hand 105A. For purposes of the example, a gesture that includes a downward swipe 110 is shown. The gesture may be configured to be performed in free space, or on an arbitrary surface, such as surface 115. Gesture 110 may be recognized using a vision-based tracking, for example from data captured by cameras 135 and/or sensors 140. Gesture 110 may be recognized as associated with a particular action, in response to detecting gesture 110, electronic device 130 may perform the action associated with gesture 110.

By contrast, FIG. 1B depicts example system set up 100B in which the user's hand is occupied by a physical object. The system set up 100B includes electronic device 130, which includes one or more cameras 135 and/or one or more depth sensors or other additional sensors 140. The various sensors collect data from a scene that includes the user's hand 105B, along with the physical object 125 occupying the user's hand 105B. As described above, in some embodiments, a tracking technique may be utilized, such as a vision-based tracking technique, to detect that the user's hand is occupied. For example, electronic device 130 may utilize object detection to detect coffee mug 125 in the scene. Additionally, or alternatively, electronic device 130 may utilize a pose estimation technique to detect that the pose of hand the hand 105 is in an occupied state.

Gesture 120 may be detected using vision-based techniques from sensor data captured by cameras 135 and/or sensors 140. In some embodiments, a tracking module detects the gesture 120, along with a geometry of the physical object 125 which affects the gesture. A tracking module may be a software module in an electronic device that uses sensor data to detect and track hand pose and/or object pose information in a scene. For example, a model of coffee mug 125 may be obtained, a geometry of an object type associated with coffee mug 125 may be obtained, and the like. In some embodiments, a transformation may be determined based on the detected modified gesture 120, and the determined geometry of the physical object 125. As such, the arc-shaped movement of gesture 120 may differ from the direct linear gesture 110 from FIG. 1A, however the two gestures may be associated with the same action.

Figure 2:
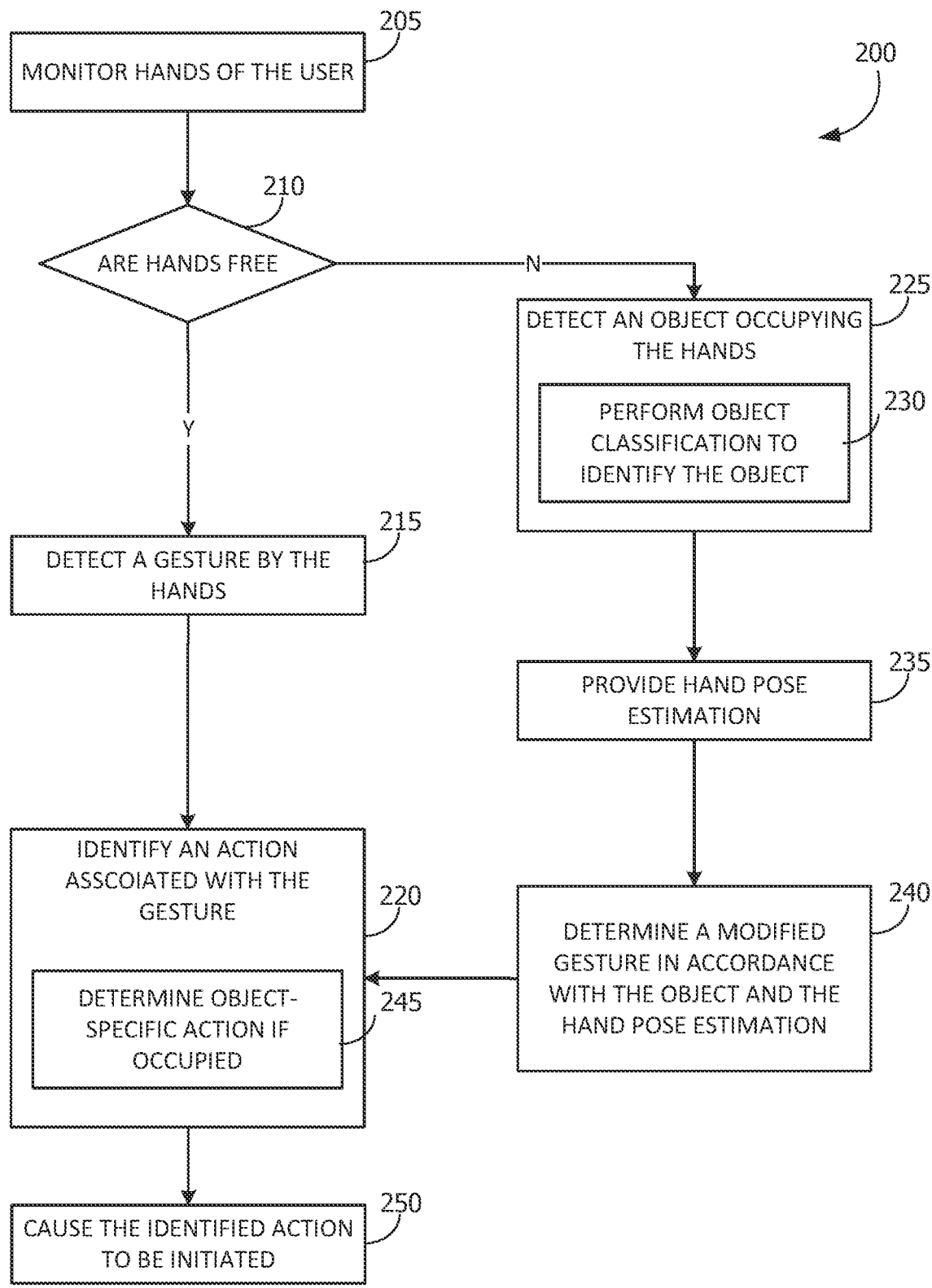
FIG. 2 shows a flowchart of a technique for determining a gesture when hands are occupied, according to one or more embodiments.

FIG. 2 shows a flowchart 200 of a technique for flowchart of a technique for using gesture recognition for triggering action when a user's hands are occupied, according to one or more embodiments. For purposes of explanation, the following steps will be described in the context of FIG. 1. However, it should be understood that the various actions may be performed by alternate components. In addition, the various actions may be performed in a different order. Further, some actions may be performed simultaneously, and some may not be required, or others may be added.

The flowchart begins at 205, where hands of the user are monitored. In one or more embodiments, one or both hands may be monitored, for example, using a vision-based tracking process. The vision-based tracking process may utilize image data captured by a camera 135 of electronic device 130. For example, electronic device 130 may include a monocular camera, stereo camera, and/or depth sensor or other sensors which may be utilized to track a user's hands in the scene. In some embodiments, the hands of the user may be monitored, for example, by a tracking module, which may use and pose estimation to determine whether a pose of the hand is associated with a unoccupied status for an unoccupied status. According to some embodiments, a deep learning technique may be applied in order to determine whether a user's hands are occupied. In some embodiments, an image of the user's hand or hands may be obtained. A trained classification network may be applied to determine whether or not the hands are occupied. The classification network may be a neural network that is trained with training images of various hands which are determined to be occupied and unoccupied. According to one or more embodiments, a hand may be occupied if it is holding an object or otherwise interacting with a physical object. In some embodiments, objects in a physical location may be detected, and the detection of the object may be considered to determine whether the hands are occupied. For example, if an object is identified as making contact with the user's hand, such as through hand and/or object tracking techniques, then a determination may be made that the hand is occupied. In some embodiments, some contact between a hand and the surface may not rise to the level of occupying the hand. For example, a touch of the pad of an index finger on a physical surface may not render the hand occupied, whereas a hand grasping a cup may render the hand occupied. As such, according to some embodiments, a hand is considered occupied if a physical object would prevent the hand from performing one or more particular gestures, such as poses, movements, and the like.

The flowchart continues to block 210, where determination is made whether the hand or hands are free or occupied. In some embodiments, a confidence value may be calculated based on the hand pose, object detection, and the like, to determine whether the hand or hands are occupied. As such, a threshold confidence value may be applied to determine at block 210 whether the hands are occupied or unoccupied. In some embodiments, a trained neural network may provide a binary classification for given image data as to whether the hand or hands are occupied or unoccupied. If at 210 a determination is made that the hands are unoccupied, then the flowchart continues to block 215. At block 215, a gesture is detected as being performed by the hand or hands. The gesture may be detected, for example, by a tracking module performing a hand tracking technique to identify predetermined poses or otherwise detect performance of a gesture. A gesture may include, for example, a pose of the hand, and movement of a hand, or the like. Further, a gesture may be characterized by movement of the entire hand, movement as a part of the hand, such as a finger or fingers, and the like. Further, a gesture may be characterized by an interaction with a physical object, such as the surface or other item in an environment, or maybe characterized by a movement in open space, regardless of any the physical surface in the environment.

At block 220, an action is identified in association with the gesture. In some embodiments, certain gestures may be associated with particular actions. An action may include a process, procedure, or the like which may be triggered in response to a particular gesture. For example, a slide up may be associated with a scrolling action. In some embodiments, the action may be associated with other contextual information of the electronic device 130 or the physical environment in which the electronic device 130 is located. For example, the gesture maybe associated with one or more applications executing on electronic device 130 when the gesture is received. For example, if the media player is running and a movement of an index finger in an upward motion is detected, the gesture maybe associated with raising a volume.

Returning to block 210, if a determination is made that the hands are occupied, then the flowchart continues to block 225. At block 225, an object occupying hands is detected. The object may be detected, for example, using a tracking module or object recognition module. In some embodiments, the object may be a known object such as a pre-registered object, or an unknown object. That is, electronic device 130 may detect an object previously recognized by electronic device 130, or the object may not be recognized. Various object detection techniques may be utilized to detect the object that is occupying the hand. At block 230, in some embodiments, object classification may be performed to identify the object. Object classification may utilize, for example, a trained classification network which may provide characteristics or other classification information for the physical object in response to receiving and image data including a physical object. The classification network may provide information regarding the object, such as an object type, object characteristics, and the like. The classification network may provide geometry information for a detected object, or may otherwise be used to determine a geometry of the object. In some embodiments, the object may be pre-registered with electronic device 130, for example in an object registration store, with geometry information for the object. Accordingly, vision-based identification may be utilized to identify registered objects in the scene, from which a geometry of the object may be determined.

At block 235, hand pose estimation is provided. And pose estimation may be provided by obtaining image data, depth information, and the like for one or more hands in the scene. The data may be compared to reference hands, for example using a trained hand pose network, or otherwise referencing reference hand poses to determine a current hand pose.

The flowchart continues at block 240, where a modified gesture is determined in accordance with the object and hand pose estimation. For example, a particular gesture may be determined based on the hand pose estimation of block 235. The intended gesture may be determined based on, for example, a geometry of the physical object occupying the hand or hands. In some embodiments, the modified gesture may be associated with the particular object, or the geometry of the physical object. For example, a particular object may be pre-registered with a particular modified gesture. In some embodiments, the modified gesture may be specific to the object. In some embodiments, the modified gesture may be determined based on user profile information, for example from user profile store 160.

The flowchart continues to block 220, where an action associated with the modified gesture is identified. In some embodiments, a transformation may be determined based on the determined modified gesture and the geometry of the physical objects, in order to determine an intended gesture such as a gesture that would have been performed if the hand had not been occupied. Said another way, the identified action is based on the modified gesture and characteristics of the physical object occupying the hand. In some embodiments, an unmodified gesture may be identified based on the modified gesture and physical object characteristics. Then an action associated with the unmodified gesture may be identified. At block 245, an object-specific action may be determined when the hands are occupied. For example, if a user is holding a cup, the cup may have preregistered gestures which may be utilized when the cup is recognized. As an example, a swipe of a finger around the lid in a circular motion may replace a swipe on a flat surface, and the like. Notably, the modified gesture may be performed using portions of the physical object not occupying the hand when the hand is occupied but not performing the gesture. An example is using the rim of a mug for a swipe action even though the rim is not directly causing the hand to be occupied. In some embodiments, the object specific actions may be stored, for example, at an object registration store.

The flowchart concludes at block 250 where the identified action is caused to be initiated. In some embodiments, the identified action may be performed by electronic device 130. Further, in some embodiments, the identified action may include sending a notification or triggering an additional device to perform an action. In some embodiments, the identified action may include initiating a new process, modifying an ongoing process, or the like.

Figure 3:
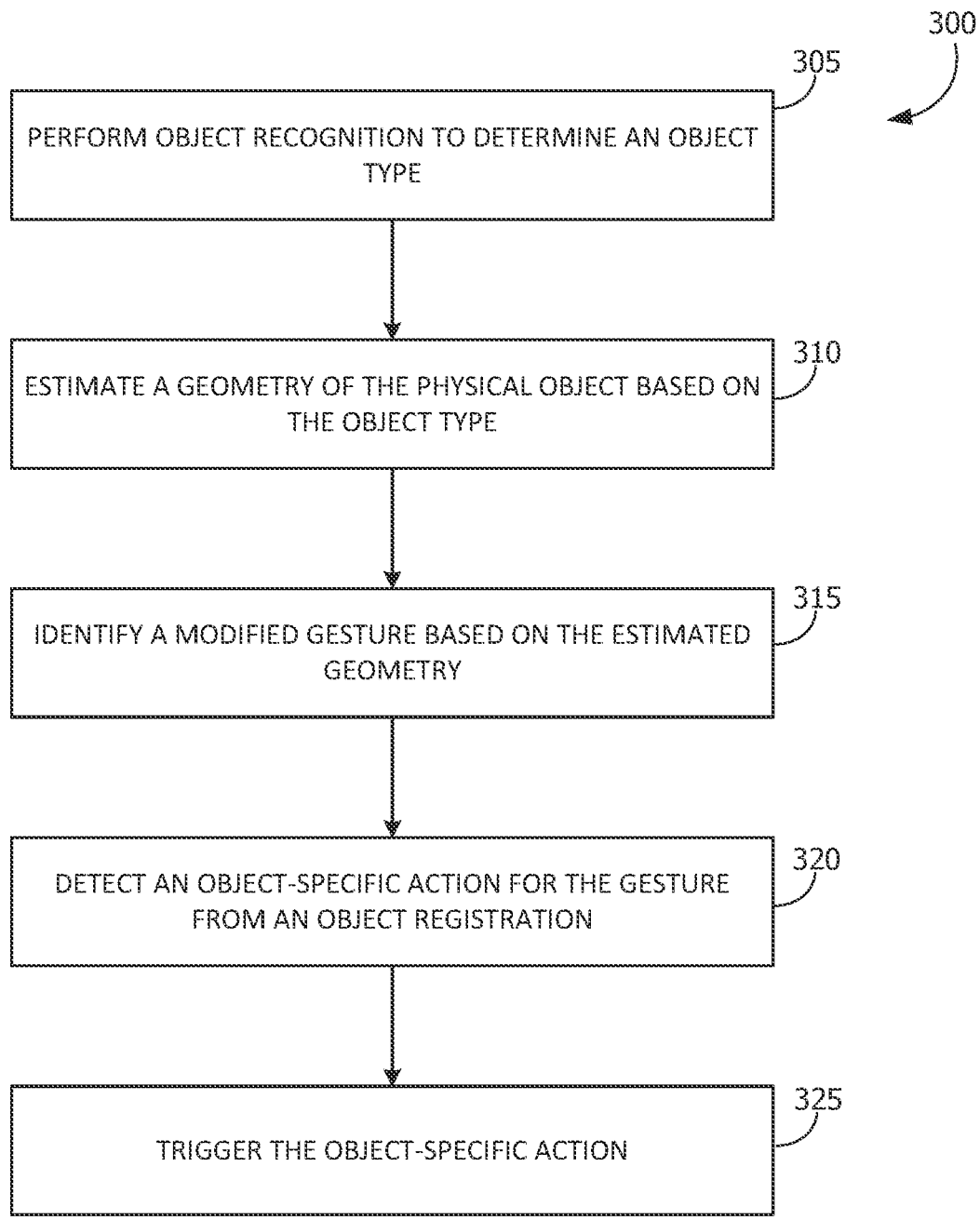
FIG. 3 shows a flowchart of a technique for determining an object-specific action for a particular gesture, in accordance with some embodiments.

FIG. 3 shows a flowchart 300 of a technique for using gesture recognition for triggering an action when a user's hands are occupied, according to one or more embodiments. For purposes of explanation, the following steps will be described in the context of FIG. 1. However, it should be understood that the various actions may be performed by alternate components. In addition, the various actions may be performed in a different order. Further, some actions may be performed simultaneously, and some may not be required, or others may be added.

The flowchart 300 begins at block 305, where the object recognition module 150 performs object recognition to determine an object type. For example, the object recognition module 150 may perform object detection in the environment, for example using vision-based tracking, to detect one or more features of the object. Those features may be utilized to identify a classification of the object, as described above.

The flowchart 300 continues to block 310, where an object recognition module estimates a geometry of the physical object based on the object type. For example, the object may be classified as a particular type at block 305, which may be utilized to determine an object's geometry. As an example, a 3D model of the physical object may be obtained based on the object type. The 3D model may be utilized to determine the geometry of the physical object, for example, by determining a scale of the physical object in relation to the model. The geometry may be a two-dimensional geometry, three-dimensional geometry, or the like. Further, in some embodiments, the geometry may be the wireframe of the surface of the physical object. At block 315, the modified gesture is identified based on the estimated geometry. The gesture may be touch or a movement of at least part of the user's hand. The touch or movement may be affected by the geometry of the physical object. For example, movement of the finger may be tracked across the geometry of the object. As another example, the movement of a hand may be limited based on a physical object occupying the hand. As an example, if a user is holding a cup of water, hand will likely not turn away as to avoid spilling the water, even if an intended gesture requires the rotation of the hand. Accordingly, the gesture may be processed as a modified gesture when the user's hand is occupied.

In some embodiments, an intended gesture may be determined based on the modified gesture and the geometry or other characteristics of the physical object. For example, a transformation may be determined between the detected modified gesture based on the estimated geometry of the physical object, or other characteristics of the physical object. For example, if the object occupying the user's hand is circular, then the movement of the finger along the geometry may generate an arc, whereas the intended gesture is a direct movement of the finger in a linear fashion.

The flowchart continues to block 320, where an object specific action for the gesture is detected from an object registration. The object specific action may include an action related to the object, or may be associated with an object specific gesture, but not necessarily an action related to the object. For example, unknown object of an odd shape may be registered such that particular modified gestures are linked to predefined actions. The object specific action may be associated with a specific object, or a classification of objects, such as those identified above at block 305. Further, the action may be a systemwide action for electronic device 130, or a global action which may include triggering a notification or instructions at a remote network device. The action may additionally, or alternatively, be based on one or more applications running in the electronic device 130. For example, gestures may be associated with one or more application types or specific applications running on the electronic device. As such, a particular action for a particular gesture may be dependent upon one or more applications executing when the gesture is identified. The flowchart concludes at block 325, where the object specific action is triggered or otherwise initiated.

Figure 4:
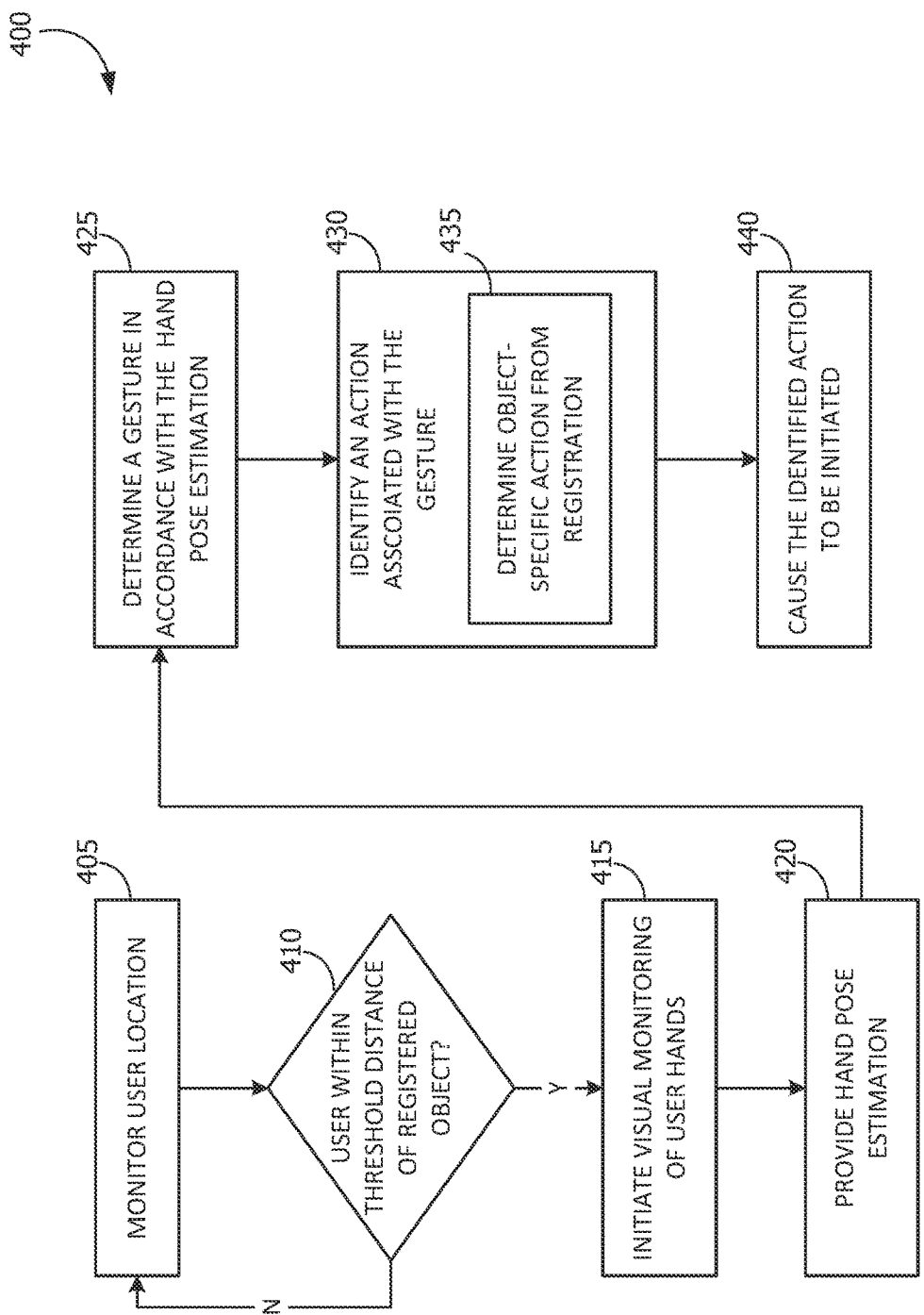
FIG. 4 shows a flowchart of a technique for utilizing object-specific actions for registered objects, according to some embodiments.

FIG. 4 depicts a flowchart of a technique for using gesture-based input for registered physical objects according to some embodiments. For purposes of explanation, the following steps will be described in the context of FIG. 1. However, it should be understood that the various actions may be performed by alternate components. In addition, the various actions may be performed in a different order. Further, some actions may be performed simultaneously, and some may not be required, or others may be added.

The flowchart begins at block 405, where a user location is monitored. In some embodiments, the user location may be monitored using Wi-Fi, GPS, visual tracking techniques, or any other localization techniques. At 410, a determination is made as to whether the user is within a threshold distance of a registered object. In some embodiments, the threshold distance may be a global threshold distance for all registered objects. Additionally, or alternatively, one or more registered objects may have unique threshold distances. If a determination is made that the user is not within a threshold distance, then the flowchart returns to 405, and the user's location is continued to be monitored. In one or more embodiments, one or more physical objects may be registered, for example in an object registration store 170, such that particular interactions with those registered objects are associated with certain actions or processes to be performed by electronic device 100.

Returning to block 410, if a determination is made that the user is with a threshold distance of the registered object, then a tracking module initiates visual monitoring of a user's hands at block 415. The visual monitoring of the user's hands may include initializing a camera or other sensor, or otherwise obtaining representative data related to the user's hands, for example for purposes of hand tracking. In some embodiments, the visual monitoring is initiated based on the threshold distance in order to conserve resources. For example, the user's location may be monitored in a low-power mode, whereas the monitoring of the user's hands is performed in a high-power mode and triggered upon determining that the user is within a predetermined proximity to the object.

The flowchart continues to block 420, where hand pose estimation is provided. In some embodiments, a tracking module performs hand pose estimation by utilizing one or more neural networks which have been trained on image data of hands performing various gestures. In some embodiments, hand pose estimation may be performed, for example, by using particular reference hand poses with the physical object or other objects belonging to the same or similar classification as a registered object. At block 425, a gesture is determined in accordance with the hand pose estimation. The gesture may be determined based on one or more predefined gestures. In addition, in some embodiments, the determined gesture may be selected from a set of gestures registered in association with a registered object. For example, in some embodiments, a confidence value may be calculated for one or more predefined gestures indicating a likelihood that a particular gesture is recognized. If the confidence value satisfies a predetermined threshold for a particular gesture, that gesture may be determined as the gesture being performed.

At block 430, an action is identified in association with the gesture. The action may be a system-wide action, such as an action that is associated with a gesture that is not necessarily tied to a particular object. As another example, as shown at block 435, the action may be an object specific action determined from the registration. For example, a particular object may be associated with particular gestures and or particular actions as defined in an object registration store.

The flowchart concludes at block 440, where the identified action is caused to be initiated. In some embodiments, the electronic device 130 initiates a process to perform the action. In one or more embodiments, electronic device 130 may transmit a notification or instructions to another device to perform the action, or the like.

Figure 5:
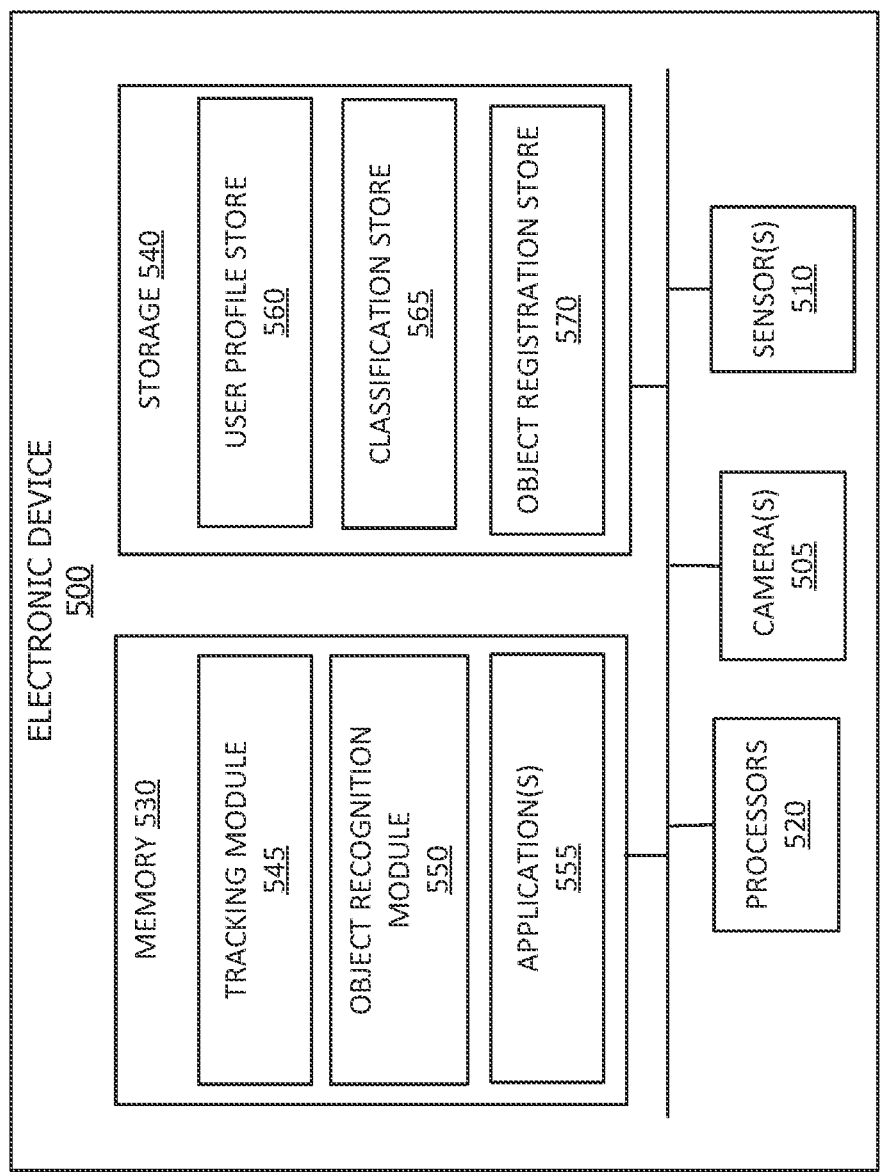
FIG. 5 shows, in block diagram form, a simplified system diagram according to one or more embodiments.

Referring to FIG. 5, a simplified block diagram of an electronic device 500 which may be utilized to provide vision-based gesture recognition. The system diagram includes electronic device 500 which may include various components. Electronic device 500 may be part of the multifunctional device, such as phone, tablet computer, personal digital assistant, portable music/video player, wearable device, base station, laptop computer, desktop computer, network device, or any other electronic device that has the ability to capture image data.

Electronic device 500 may include one or more processors 520, such as a central processing unit (CPU). Processor(s) 520 may include a system-on-chip such as those found in mobile devices and include one or more dedicated graphics processing units (GPUs). Further, processor(s) 520 may include multiple processors of the same or different type. Electronic device 500 may also include a memory 530. Memory 530 may include one or more different types of memory, which may be used for performing device functions in conjunction with processor(s) 505.

Memory 530 may store various programming modules for execution by processor(s) 520, including tracking module 545, object recognition module 550, and other various applications 555.

Electronic device 500 may also include storage 540. Storage 540 may include user profile store 560, which may include data regarding user-specific gestures, user-specific preferences, and the like. Storage 540 may also include a classification store 565. Classification store 565 may include data that may be utilized to classify physical objects detected in an environment. Classification store 565 may also include data to classify whether a user's hands are occupied such as reference poses and/or reference images.

In one or more embodiments, classification store 565 may include one or more trained networks used for classification. As an example, deep learning may be used to train a binary classifier to determine whether or not a hand is occupied. For example, the classifier may be trained on datasets of occupied and unoccupied hands. The classifier may be trained such that the classifier presents an occupied or not occupied classification for a particular image or images of a hand. In one or more embodiments, classification store may provide data utilized to estimate an object type, for example using object recognition. As an example, a model may be used to receive an image data and determine a type of object among various types of objects a user may interact with.

Storage 540 may also include an object registration store 570. Object registration store 570 may store data regarding known objects. For example, the object registration store 570 may store geometries and other characteristics for known objects, such as pre-registered objects. In addition, object registration store 570 may store data regarding object-specific gestures or actions. That is, a same gesture may be performed in conjunction with two different registered objects and cause two different actions to be performed. The object registration store may store associations between registered objects, gestures, actions, or any combination thereof.

In some embodiments, the electronic device 500 may include other components utilized for vision-based tracking, such as one or more cameras 505 and/or other sensors 510, such as one or more depth sensors. In one or more embodiments, each of the one or more cameras 505 may be a traditional RGB camera, a depth camera, or the like. Further, cameras 505 may include a stereo or other multi camera system, a time-of-flight camera system, or the like which capture images from which depth information of the scene may be determined.

In one or more embodiments, tracking module 545 may track user characteristics, such as location and/or gesture. The tracking module 545 may determine whether a user is intending to perform a gesture, which may or may not include an interaction with a physical object, using vision-based tracking. For example, a gesture may be a predefined pose or movement associated with a particular action or actions. In some embodiments, the gesture may be defined as a movement in free space of an environment, or along a surface. For example, a touch along a surface may be a characteristic of a predefined gesture. The tracking module 545 may determine when a touch occurs, for example, by obtaining depth information for a hand and the surface. As an example, the tracking module 545 may receive or obtain depth information from the camera 505, the depth sensor or other sensors 510. Further, the tracking module 545 may determine touch information from other data, such as stereo images captured by camera(s) 505, and the like. The tracking module 545 may then determine, based on the signal, that a touch event has occurred. In one or more embodiments, the estimation may be based on a number of factors, such as by utilizing a predefined model of a finger or other touching object, and/or the physical keyboard.

In some embodiments, the tracking module 545 may perform hand tracking to detect gestures. As an example, the electronic device 500 may have or have access to a hand model store for various hand poses. Those poses may be used as reference poses to which a current image of a hand may be compared. In some embodiments, the various hand poses may be associated with particular gestures and/or particular actions, for example in user profile store 560 or object registration store 570. In some embodiments, the hand model store may include hand poses of unoccupied hands, as well as occupied hands when the hands are occupied by various objects.

According to some embodiments, the object recognition module 550 may detect an object in a scene. For example, the object recognition module 550 may determine if a user's hands are in contact with a physical object, and may determine a type of object in the user's hands, such as by classification data in classification store 565. In some embodiment, an object occupying the user's hand or hands may be detected by the object recognition module 550 as a known object such as a pre-registered object from object registration store 570.

In some embodiments, tracking module 545 may be configured to track a user's location to determine if the user comes within a predetermined distance of a known object, such as an object registered in object registration store. In some embodiments, the tracking module 545 may use localization data to identify a location of the user, such as Wifi, GPS information, visual odometry, and the like. In some embodiments, the predetermined distance may be a threshold distance for a particular object, or for any registered object. The tracking module 545 may begin hand tracking to detect a gesture, for example, when the user is within the threshold distance of the registered object.

Although electronic device 500 is depicted as comprising the numerous components described above, and one or more embodiments, the various components and functionality of the components may be distributed differently across one or more additional devices, for example across a network. For example, in some embodiments, any combination of user profile store 560, classification store 565, and object registration store 570 may be partially or fully deployed on additional devices, such as network devices, network storage, and the like. Similarly, in some embodiments, the functionality of tracking module 545 and object recognition module 550 may be partially or fully deployed on additional devices across a network.

Further, in one or more embodiments, electronic device 500 may be comprised of multiple devices in the form of an electronic system. Accordingly, although certain calls and transmissions are described herein with respect to the particular systems as depicted. In one or more embodiments, the various calls and transmissions may be differently directed based on the differently distributed functionality. Further, additional components may be used, or some combination of the functionality of any of the components may be combined.

Figure 6:
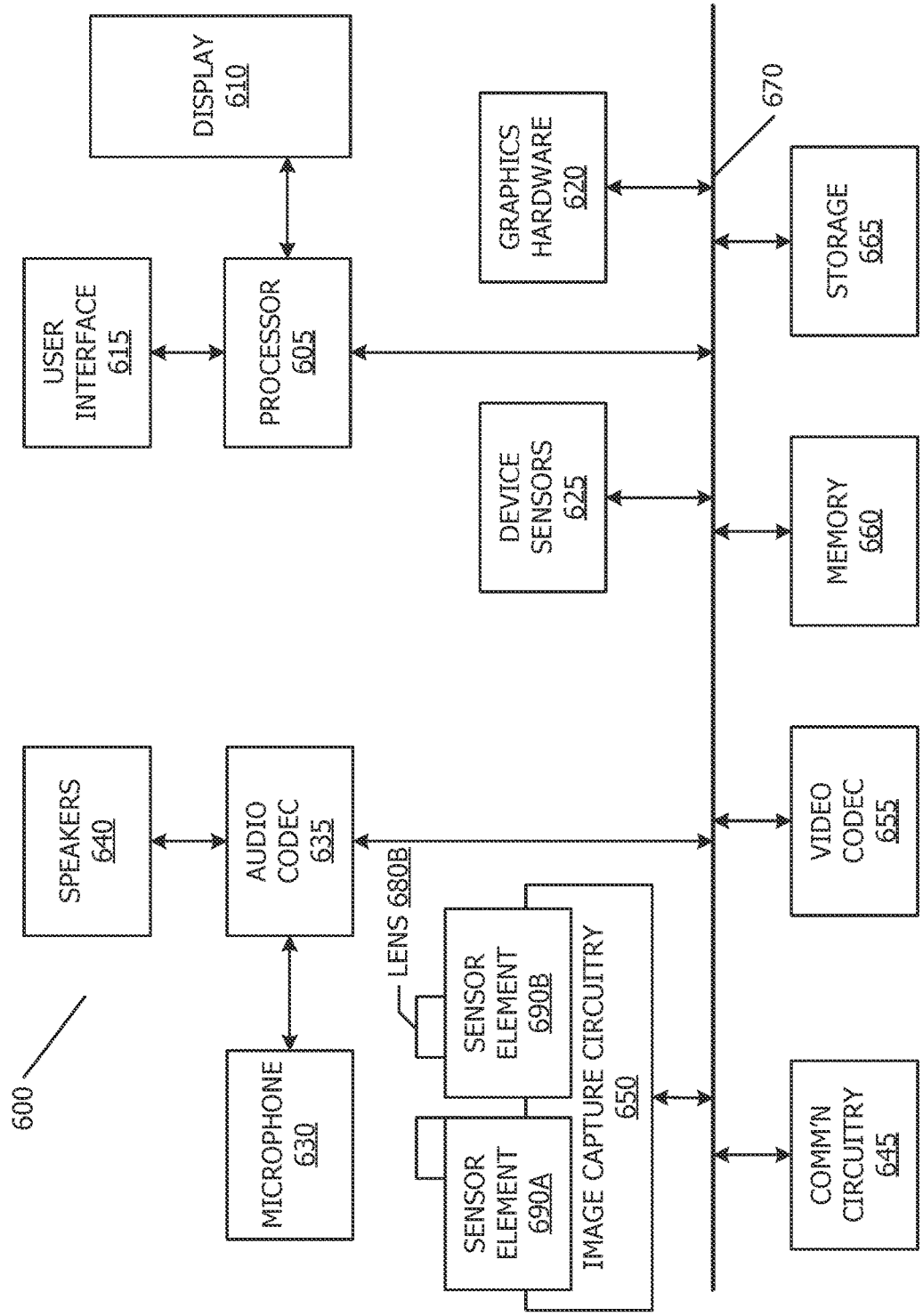
FIG. 6 shows, in block diagram form, a computer system in accordance with one or more embodiments.

Referring now to FIG. 6, a simplified functional block diagram of illustrative multifunction electronic device 600 is shown according to one embodiment. Each of electronic devices may be a multifunctional electronic device, or may have some or all of the described components of a multi-functional electronic device described herein. Multifunction electronic device 600 may include some combination of processor 605, display 610, user interface 615, graphics hardware 620, device sensors 625 (e.g., proximity sensor/ambient light sensor, accelerometer and/or gyroscope), microphone 630, audio codec 635, speaker(s) 640, communications circuitry 645, digital image capture circuitry 650 (e.g., including camera system), memory 660, storage device 665, and communications bus 670. Multifunction electronic device 600 may be, for example, a mobile telephone, personal music player, wearable device, tablet computer, and the like.

Processor 605 may execute instructions necessary to carry out or control the operation of many functions performed by device 600. Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen, touch screen, and the like. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include one or more lens assemblies, such as 680A and 680B. The lens assemblies may have a combination of various characteristics, such as differing focal length and the like. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still images, video images, enhanced images, and the like. Output from image capture circuitry 650 may be processed, at least in part, by video codec(s) 655 and/or processor 605 and/or graphics hardware 620, and/or a dedicated image processing unit or pipeline incorporated within circuitry 645. Images so captured may be stored in memory 660 and/or storage 665.

Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or computer readable code organized into one or more modules and written in any desired computer programming language. When executed by, for example, processor 605 such computer program code may implement one or more of the methods described herein.

As described above, one aspect of the present technology is providing visual-based gesture recognition. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to detect objects in a user's environment and associated hand gestures. Accordingly, use of such personal information data enables users to identify real objects and hand gestures from image data.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIP4); whereas health data in other countries may be subject to other regulations and policies and should be handled accordingly. Hence different privacy practices should be maintained for different personal data types in each country.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-4 or the arrangement of elements shown in FIGS. 1, 5, and 6 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:
   detect that a user of a wearable device is within a predetermined distance of a first registered object of a plurality of registered object;
   in response to the detection, initiate, at the wearable device, hand tracking to monitor one or more hands of the user for an interaction with the first registered object,
   determine a first gesture from the interaction based on the hand tracking,
   determine a first object-specific action corresponding to the first gesture and the first registered object, and
   trigger, by the wearable device, the first object-specific action,
   wherein the wearable device triggers a second object-specific action for the first gesture when the first gesture is determined in association with a second registered object.

2. The non-transitory computer readable medium of claim 1, wherein the first object-specific action triggered is based on an object recognition database comprising registered actions for a plurality of gestures.

3. The non-transitory computer readable medium of claim 1 further comprising computer readable code to:
   in response to the detection, initialize a camera,
   wherein the first gesture is determined from image data captured by the camera.

4. The non-transitory computer readable medium of claim 3, wherein the computer readable code to determine a first gesture from the detected interaction further comprises computer readable code to perform hand pose estimation to identify an orientation of the one or more hands.

5. The non-transitory computer readable medium of claim 4, wherein the computer readable code to perform hand pose estimation to identify an orientation of the hand further comprises computer readable code to apply, to the image data, a network trained on image data of hands performing a plurality of gestures.

6. The non-transitory computer readable medium of claim 1, wherein the computer readable code to detect that the user is within a predetermined distance of the first registered object is processed in a first system mode, and where the first gesture is detected in a second system mode.

7. The non-transitory computer readable medium of claim 1, wherein the computer readable code to detect that a user is within a predetermined distance of a first registered object further comprises computer readable code to track a location of the user in relation to each of the plurality of registered objects.

8. The non-transitory computer readable medium of claim 1, further comprising computer readable code to:
   detect that the user is within a predetermined distance of a second registered object;
   in accordance with the detection that the user is within a predetermined distance of the second registered object, monitor the one or more hands of the user for an interaction with the second registered object;
   in the interaction with the second registered object, detect a second gesture from the interaction; and
   trigger a second action associated with the second registered object and the second gesture, wherein the first action is different than the second action, and wherein the first gesture is equivalent to the second gesture.

9. A system comprising:
   one or more processors; and
   one or more computer readable media comprising computer readable code executable by the one or more processors to:
   detect that a user of a wearable device is within a predetermined distance of a first registered object of a plurality of registered objects;
   in response to the detection, initiate hand tracking to monitor one or more hands of the user for an interaction with the first registered object,
   determine a first gesture from the interaction based on the hand tracking,
   determine a first object-specific action corresponding to the first gesture and the first registered object, and
   trigger, by the wearable device, the first object-specific action,
   wherein the wearable device triggers a second object-specific action for the first gesture when the first gesture is determined in association with a second registered object.

10. The system of claim 9, wherein the first object-specific action triggered is based on an object recognition database comprising registered actions for a plurality of gestures.

11. The system of claim 9, further comprising computer readable code to:
   in response to the detection, initialize a camera,
   wherein the first gesture is determined from image data captured by the camera.

12. The system of claim 11, wherein the computer readable code to determine a first gesture from the detected interaction further comprises computer readable code to perform hand pose estimation to identify an orientation of the one or more hands.

13. The system of claim 12, wherein the computer readable code to perform hand pose estimation to identify an orientation of the hand further comprises computer readable code to apply, to the image data, a network trained on image data of hands performing a plurality of gestures.

14. The system of claim 9, wherein the computer readable code to detect that the user is within a predetermined distance of the registered object is processed in a first system mode, and where the gesture is detected in a second system mode.

15. The system of claim 9, wherein the computer readable code to detect that a user is within a predetermined distance of a first registered object further comprises computer readable code to track a location of the user in relation to each of the plurality of registered objects.

16. The system of claim 9, further comprising computer readable code to:
   detect that the user is within a predetermined distance of a second registered object;
   in accordance with the detection that the user is within a predetermined distance of the second registered object, monitor the one or more hands of the user for an interaction with the second registered object;
   in accordance with the interaction with the second registered object, detect a second gesture from the interaction; and
   trigger a second action associated with the second registered object and the second gesture, wherein the first action is different than the second action, and wherein the first gesture is equivalent to the second gesture.

17. A method comprising:
   detecting that a user of a wearable device is within a predetermined distance of a first registered object of a plurality of registered object;
   in response to the detection, initiating hand tracking to monitor one or more hands of the user for an interaction with the first registered object,
   determining a first gesture from the interaction based on the hand tracking,
   determine a first object-specific action corresponding to the first gesture and the first registered object, and
   triggering, by the wearable device, the first object-specific action,
   wherein the wearable device triggers a second object-specific action for the first gesture when the first gesture is determined in association with a second registered object.

18. The method of claim 17, wherein the first object-specific action triggered is based on an object recognition database comprising registered actions for a plurality of gestures.

19. The method of claim 17, further comprising:
   in response to the detection, initializing a camera,
   wherein the first gesture is determined from image data captured by the camera.

20. The method of claim 17, further comprising:
   detecting that the user is within a predetermined distance of a second registered object;
   in accordance with the detection that the user is within a predetermined distance of the second registered object, monitoring the one or more hands of the user for an interaction with the second registered object;
   in accordance with the interaction with the second registered object, detecting a second gesture from the interaction; and
   triggering a second action associated with the second registered object and the second gesture, wherein the first action is different than the second action, and wherein the first gesture is equivalent to the second gesture.

* * * * *

UNITED STATES PATENT AND TRADEMARK OFFICE
CERTIFICATE OF CORRECTION

PATENT NO. : 12,439,145 B1
APPLICATION NO. : 17/448638
DATED : October 7, 2025
INVENTOR(S) : Nathaniel R. Finney et al.

It is certified that error appears in the above-identified patent and that said Letters Patent is hereby corrected as shown below:

In the Claims

Claim 1, Column 13, Line 5: replace the words "Anon-transitory" with the words -- A non-transitory --

Signed and Sealed this
Eleventh Day of November, 2025

John A. Squires
*Director of the United States Patent and Trademark Office*